United States Patent [19]

Berndt et al.

[11] Patent Number: 4,910,180

[45] Date of Patent: Mar. 20, 1990

[54] CATALYST AND PROCESS FOR ITS PREPARATION

[75] Inventors: Malte Berndt; Dieter Ksinsik, both of Sinsheim-Rohrbach, Fed. Rep. of Germany

[73] Assignee: Doduco GmbH & Co., Pforzheim, Fed. Rep. of Germany

[21] Appl. No.: 259,035

[22] Filed: Oct. 17, 1988

[30] Foreign Application Priority Data

Oct. 16, 1987 [DE] Fed. Rep. of Germany ....... 3735033

[51] Int. Cl.$^4$ .......................... B01J 21/04; B01J 23/40
[52] U.S. Cl. ..................................... 502/304; 502/332; 502/333; 502/334; 423/213.5
[58] Field of Search ............... 502/304, 333, 334, 332; 423/213.5

[56] References Cited

U.S. PATENT DOCUMENTS

| | | | |
|---|---|---|---|
| 4,367,162 | 1/1983 | Fujitani et al. | 502/304 X |
| 4,587,231 | 5/1986 | Sawamura et al. | 502/304 |
| 4,624,941 | 11/1986 | Berndt et al. | 502/304 X |

*Primary Examiner*—W. J. Shine
*Attorney, Agent, or Firm*—Balogh, Osann, Kramer, Dvorak, Genova & Traub

[57] ABSTRACT

A process for the preparation of catalysts, in particular for the purification of exhaust gases from internal combustion engines, is described, which makes it possible to use supports stable up to at least 1,200° C. which are free of gamma-aluminium oxide and transition aluminium oxide and nevertheless have a high catalytic activity. The catalytically active noble metal as the constituent of a composite powder is attached to the support, which in addition to the noble metal contains a thermally stable metal oxide and is prepared by the spray pyrolysis process.

18 Claims, No Drawings

CATALYST AND PROCESS FOR ITS PREPARATION

The invention starts from catalysts, in particular for the purification of exhaust gases from internal combustion engines, consisting of a metallic, mineral or ceramic support to which in a surface layer a very fine composite powder is attached whose particle size is smaller than 10 $\mu$m (diameter) and whose smaller portion consists of one or more catalytically active noble metals and whose predominant portion consists of one or more metal oxides or metal mixed oxides which have a structure stable up to at least 1,200° C. and do not react with the noble metals. These catalysts and a process for their preparation have been disclosed in U.S. Pat. No. 4,624,941. In the catalysts prepared by a known process, the catalytically active noble metal is bound finely distributed to a sintered gamma-aluminium oxide skeleton which is stabilized by a rare earth metal oxide. The use of gamma-aluminium oxide is customary in the prior art, due to its porous structure, which leads to a large active catalyst surface area. However, gamma-aluminium oxide has the disadvantage of being thermally unstable. Starting at about 600° C. and increasing above 900° C., gamma-aluminium oxide is converted through intermediate stages (transition aluminium oxide) into alpha-aluminium oxide. The difference between gamma-aluminium oxide and alpha-aluminium oxide is similar to the difference a clay shard and a porcelain shard: the clay shard is porous and porcelain shard is densely sintered. Accordingly, upon conversion of gamma-aluminium oxide into alpha-aluminium oxide, an increasing number of pores of the aluminium oxide skeleton become sealed, thus trapping the catalytically active noble metal bound to the aluminium oxide, with the result that it is no longer available for catalytic reactions and the chemical conversion achievable by means of the catalyst becomes small.

There has not been a lack of attempts to increase the temperature up to which a catalyst in which the catalytically active noble metal is bound to gamma-aluminium oxide can be operated so that it may reach a predetermined service life, this being attempted by additives which have the function of stabilizing the structure of gamma-aluminium oxide (see, for example, DE 3,239,513 C2, DE 3,223,500 A1, EP 0,199,509 A2). Additives with which a stabilization of gamma-aluminium oxide can be achieved comprise certain high-temperature-resistant metal oxides, for example thorium oxide, barium oxide, zirconium oxide or oxides of the rare earth metals (cerium, lanthanum, neodymium, praseodymium, samarium) or mixtures thereof. However, the conversion of gamma-aluminium oxide cannot be prevented with these additives but can only be shifted to somewhat higher temperatures and therefore be delayed. However, no great progress has been made in recent times in the efforts regarding the stabilization of gamma-aluminium oxide because its stabilization through additives is limited for physical reasons. Some progress has been made by the process described in DE 3,436,400, according to which a solution which contains at least one noble metal salt and a salt of at least one rare earth metal is subjected to spray pyrolysis in the presence of oxygen. This gives a composite powder consisting of the oxide of the rare earth metal and the noble metal. This composite powder is then deposited on a surface layer of a catalyst support consisting of transition aluminium oxide or gamma-aluminium oxide and immobilized on the support by sintering in air at temperatures between 400° and 600° C. This heat treatment is designated in the literature in most cases as calcining. As expected, DE 3,436,400 teaches that it is best to use gamma-aluminium oxide stabilized with a rare earth metal oxide for the catalyst support. The upper temperature limit at which the catalysts described in DE 3,436,400 A1 can be used is about 1,050° C. However, modern combustion engines reach exhaust gas temperatures of up to 1,200° C., in rare cases even up to 1,300° C., in full-load operation. The hitherto customary catalysts cannot cope with that.

Accordingly, the object of the present invention is to produce catalysts which are suitable, in particular, for the purification of exhaust gases of internal combustion engines and have an improved heat resistance and a sufficient activity even in the starting phase of the engine at a low exhaust gas temperature.

According to the present invention, there is provided a catalyst consisting of a metallic, mineral, or ceramic support to which in a surface layer a very fine composite powder is attached whose particle size is smaller than 10 $\mu$m (diameter) and whose smaller portion consists of one or more catalytically active noble metals and whose predominant portion consists of one or more metal oxides or metal mixed oxides which have a structure stable up to at least 1,200° C. and do not react with the noble metals, characterized in that the support is free of gamma-aluminium oxide and transition aluminium oxide and is chosen in such a manner that it has a structure stable up to at least 1,200° C. even without a stabilizing additive of rare earth metal oxides.

According to another aspect of the present invention, there is provided a process for the preparation of catalysts having the features given above by applying the process consisting of the steps:

preparation of a solution containing a salt of one or more catalytically active noble metals and a salt of one or more oxidizable metals whose oxides or mixed oxides have a structure stable up to at least 1,200° C. and do not react with the catalytically active noble metal, subjecting this solution to spray pyrolysis in the presence of oxygen, applying the composite powder thus produced to a support and attaching it thereon or in a surface layer by calcining, in which the support is free of gamma-aluminium oxide and transition aluminium oxide and have a structure stable up to at least 1,200° C. even without a stabilizing addition of rare earth metal oxides.

While those skilled in the art have hitherto assumed that in the case of catalysts for the purification of exhaust gases the best results are obtained if gamma-aluminium oxide is chosen as the support substance for the catalytically active noble metal, it has now been found that similarly active catalysts are obtained by constructing the catalyst support of a material which even without a stabilizing additive has a structure stable up to at least 1,200° C., is in particular free of gamma-aluminium oxide which is converted at these high temperatures and of transition aluminium oxide, and by immobilizing the catalytically active noble metal in the form of a fine composite powder on the support or in a surface layer of the support which, in addition to the noble metal, contains one or more oxides or mixed oxides having a structure stable up to at least 1,200° C. and has been prepared by the process of spray pyrolysis. This result could not be expected because the catalyst supports which are not converted up to at least 1,200° C. cannot form such a large active catalyst surface area as the porous gamma-aluminium oxide. The novel finding that, despite not using gamma-aluminium oxide and transition aluminium oxide, it is possible to prepare according to the invention catalyts having a similar activity even at low temperatures, opens up widespread areas of application, in particular in the area of purification of exhaust gases of internal combustion engines, for these catalysts due to their highly improved heat resistance and the attendant extension of their service life.

A large number of materials are suitable as catalyst supports. When selecting the materials, it is of course necessary to make sure that they are stable under the conditions of the application for which they are to be used, they do not react with the catalytically active noble metal and that it is possible to immobilize firmly the noble metal containing composite powder on them. Metallic, mineral and ceramic supports are suitable. Accordingly, metallic supports can be heat-resistant iron alloys, stainless steels and steels having a high nickel content. Ferritic, aluminium-containing alloys based on iron of the composition 10 to 30% by weight of Cr, 1 to 10% by weight of Al, 0.05% by weight of C, 0.1 to 3% by weight of Y, balance Fe have also proved to be useful. Examples of mineral supports are those consisting of cordierite and mullite. Examples of cermic supports are those consisting of thorium oxide, zirconium dioxide and silicon nitride. In the prior art, the catalyst supports are coated with gamma-aluminium oxide or transition aluminium oxide in which the catalytically active noble metal is immobilized, the coating usually being carried out by the washcoat process. However, according to the invention, a coating of gamma-aluminium oxide or transition aluminium oxide is not used. Rather, the noble metal containing composite powder can in general be applied directly to the supports made of the materials mentioned as long as their surface is thus that the composite powder can be sufficiently firmly immobilized thereon. However, it is also possible and even preferred to form a layer of alpha-aluminium oxide on these supports and to immobilize on this layer, possibly even in this layer, the noble metal containing composite powders. Furthermore, it is possible to manufacture the catalyst support altogether of alpha-aluminium oxide.

In the abovementioned aluminium-containing steel, an alpha-aluminium oxide layer can be prepared simply by heating this steel for some time in air, for example for two hours at 900° C. This leads to the formation of a thin (no more than a few $\mu$m thick) alpha-aluminium oxide layer on the surface, which, on the one hand, protects the steel against corrosion and, on the other, constitutes a good adhesive surface for the coating with the composite powder. However, it is also possible to coat the supports by spraying, by chemical (CVD) or physical (PVD) deposition from the gas phase with alpha-aluminium oxide. It is best to coat ceramic and mineral supports by the washcoat process. In this process, an aqueous dispersion of alpha-aluminium oxide powder is prepared, into which the support is dipped, dried and then calcined at temperatures between 300° C. and 700° C.

The supports can be mouldings of a large variety of geometrical shapes, for example, balls, cylinders, rods, fibres, rings, etc., which can also be used as bulk material. Honeycomb-like supports, which in the case of metallic supports can consist of a corrugated, coiled sheet, are usually used for the purification of exhaust gases in automobiles.

The catalyst support should have a rough surface because it favours the firm attachment of the composite powder and enlarges the active catalyst surface area. For this purpose, the pores of the surface, which determine the roughness of the surface, should be larger, preferably much larger, than the particles of the composite powder. It is particularly recommended to choose the diameter of the pores about 5 times to 50 times as large as the particle size of the composite powder, the size of which should be between 0.1 $\mu$m and 10 $\mu$m, preferably smaller than 5 $\mu$m, more preferably 1 $\mu$m, in diameter. Diameters between 1 $\mu$m and 50 $\mu$m are particularly recommended for the pores of the support into which the composite powder is incorporated. Such pore sizes can be obtained by coating the support with an aluminium oxide powder whose particle size is between 1 $\mu$m and 100 $\mu$m, preferably between 5 $\mu$m and 50 $\mu$m and should preferably be about 10 times as large as the particle size of the composite powder.

The spray pyrolysis process, according to which the composite powder is prepared, has been described, for example, in U.S.-A 3,510,291, in EP 0,012,202 A1 and also in DE 2,929,630 C2. Using the spray pyrolysis process, very fine composite powders are obtained by dissolving the noble metals and the oxidizable metals in a liquid and atomizing the solution in a hot reactor into a flame in such a manner that the solvent evaporates instantly and the resulting solid particles are reacted at a temperature below the melting temperature of the dissolved metals with the oxygen in the reactor atmosphere to give very fine powder particles, in which the noble metal is present in very finely divided form along with the metal oxide to which it is bound. Suitable noble metals are primarily platinum, palladium, rhodium and ruthenium. Suitable oxidic constituents for the composition powder are, for example, cerium oxide ($CeO_2$), zirconium oxide ($ZrO_2$), titanium dioxide ($TiO_2$), magnesium oxide (MgO), silicon dioxide ($SiO_2$), alpha-aluminium oxide (alpha-$Al_2O_3$), perovskite ($CaTiO_3$) and other titanates such as, for example, barium titanate ($BaTiO_3$), lanthanate and aluminates. These oxides are stable up to above 1,200° C. and do not react with the catalytically active noble metals. Preferably, the oxidic constituent of the composite powder is chosen in such a manner that it acts as a promoter under the intended conditions for use of a catalyst, that is, that it promotes the catalyzed reaction by favoring the adduction of the substance to be reacted catalytically to the catalyst surface. This constitutes a specific advantage of the process according to the invention, which allows, independently of the support material chosen, to bind the catalytically active noble metal in extremely finely divided form to a promoter. It is also quite possible to combine different oxides in the composite powder with one another to achieve optimum activity of the catalyst. In the purification of exhaust gases of automobiles, cerium oxide is suitable to be used as a promoter.

Both activity of the catalyst and also adhesive strength of the composite powder of the catalyst support, can be improved by milling the composite powder in a ball mill before applying it to the catalyst support. Milling in the ball mill crushes the originally more ball-like agglomerate of the composite powder with the formation of flake-like powder particles, thus exposing the noble metal trapped in the originally spherical agglomerates.

The noble metal content in the composite powder is chosen, depending on the particular use, to be between 0.1 and 20% by weight, preferably between 1 and 10% by weight. The amount of the composite powder applied to the catalyst support depends upon how much noble metal is required per liter of catalyst volume.

Below, working examples are given, according to which a catalyst according to the invention can be prepared.

EXAMPLE 1

The catalyst support used was a corrugated, coiled metal foil made of a high-temperature-resistant ferritic steel, which as protection against corrosion and as adhesion promoter carries an alpha-aluminium oxide layer. 100 parts by weight of an alpha-aluminium oxide powder having a particle size between 5 and 50 $\mu$m are suspended in 250 parts by weight of water. The support consisting of the coiled steel foil is dipped into this suspension, the excess is then blown off, the support is dried at 120° C. to 150° and C. and then calcined in air at 550° C. This process is repeated until the support has taken up 50 g of alpha-aluminium oxide per liter of support volume.

Atomization of an aqueous solution of $H_2PdCl_6$ and $Ce(NO_3)_4$ in a reactor heated to about 950° C. and having an oxygen atmosphere produces a fine composite powder containing 6 parts by weight of palladium and 94 parts by weight of cerium oxide. One part by weight of the composite powder is then suspended in 50 parts by weight of water, and the support coated with alpha-aluminium oxide is dipped into this suspension, the excess is blown off, the support is dried in an air stream at 150° C. and subsequently calcined in air at temperatures between 450° C. and 600° C. for 1 to 4 hours. This process is repeated until the support has taken up to 1.5 g of palladium per liter of its volume.

EXAMPLE 2

The catalyst support used is a cylindrical honeycomb structure made of cordierite having 62 cells per cm$^2$ of cross-section and a length of 7.6 cm and a diameter of 2.54 cm. This support is coated in the same way as in the first example with alpha-aluminium oxide until it has taken up 25% by weight (relative to the weight of the cordierite structure) of alpha-aluminium oxide.

Atomization of an aqueous solution of $H_2PtCl_6$ and $Ce(NO_3)_4$ in a reactor heated to about 950° C. and having an oxygen atmosphere produces a fine composite powder containing 6 parts by weight of platinum and 94 parts by weight of cerium oxide. One part by weight of the composite powder is then suspended in 50 parts by weight of water, and the cordierite support coated with alpha-aluminium oxide is dipped into this suspension, the support is dried in an air stream at 150° C. and subsequently calcined at 500° C. This process is repeated until the support has taken up 1.5 g of platinium per liter of the volume of the support.

COMPARATIVE EXAMPLE

The catalyst support used in a honeycomb structure made of cordierite as in Example 2.

100 parts by weight of fine-grained gamma-aluminium oxide powder and 4 parts by weight of a mixture of fine-grained cerium oxide ($CeO_2$) and lanthanum oxide ($La_2O_3$) having a particle size of less than 100 $\mu$m are suspended in 250 parts by weight of water. The cordierite honeycomb structure is dipped into this suspension, dried and calcined as described in Example 1, the coating being additionally activated with 3 to 5% by weight of iron oxide ($Fe_2O_3$), which is added to the aqueous suspension, before the catalytically active noble metal is applied.

The coated catalyst support is dipped into an aqueous solution of $H_2PtCl_6$ and $Rh(NO_3)_3$ containing platinum and rhodium in a weight ratio of Pt:Ph=5:1. The honeycomb structure impregnated with the noble metal salt solution is dried and subjected to a treatment in a reducing atmosphere at 500° C. to reduce the noble metal compounds to the noble metal. The impregnating process is carried out in such a manner that the honeycomb structure takes up 1.5 g of noble metal per liter of the honeycomb structure volume.

The catalysts prepared according to the preceding examples were tested for their catalytic activity. The testing was carried out in a reactor. The gas composition in the reactor corresponded to a synthetic exhaust gas having the components CO, NO and hydrocarbons (propane and propene in a ratio of 1:1) in a compositin such as is present at $\lambda=1.0$ ($\lambda$ denotes the stoichiometric ratio of the amount of air to the amount of fuel in air/fuel mixtures).

The test was carried out at increasing temperature at a catalyst load of 50,000 l of exhaust gas per hour and per liter of catalyst volume. The temperature at which not only the nitrogen oxide content but also the hydrocarbon contents and the carbon monoxide content could each be reduced by 90% was determined. First, the measurements were carried out using fresh catalysts. After that, the catalysts were aged by heating them in an electric furnace to a temperature of 1,000° C., maintaining them at this temperature in air for 4 hours and then cooling them again. Measurements were then carried out again to determine at which temperature 90% conversion can be achieved using the catalyst. The results are listed in the table below.

| | Operating temperatures (°C.) for 90% conversion | | | | | |
|---|---|---|---|---|---|---|
| | Fresh catalyst | | | Aged catalyst | | |
| | CO | HC | NO | CO | HC | NO |
| Example 1 | 258 | 292 | 262 | 254 | 296 | 260 |
| Example 2 | 242 | 290 | 246 | 302 | 338 | 300 |
| Comparative example | 198 | 248 | 200 | 336 | 400 | 318 |

The numbers show that the operating temperature required for 90% conversion strongly increases by ageing in the case of the prior art catalyst (comparative example). This is reflected by the unsatisfactory thermostability of the gamma-aluminium oxide despite the stabilizing additives. In contrast, in the case of the catalysts according to the invention, ageing does not lead to any (Example 1) or to a comparatively small increase of the operating temperature required for 90% conversion, the operating temperatures required for 90% conversion to both cases being lower than in the prior art. The comparison shows that catalysts prepared according to the invention have better heat resistance and an improved activity even in the starting phase of an internal combustion engine.

We claim:

1. Catalyst consisting of a metallic, mineral or ceramic support to which in a surface layer a very fine composite powder is attached whose particle size is smaller than 10 $\mu$m (diameter) and whose smaller portion consists of one or more catalytically active noble metals and whose predominant portion consists of one or more metal oxides or metal mixed oxides which have a structure stable up to at least 1,200° C. and do not react with the noble metals, characterized in that the support is free of gamma-aluminium oxide and transition aluminium oxide and is chosen in such a manner that it has a structure stable up to at least 1,200° C. even without a stabilizing additive of rare earth metal oxides.

2. Catalyst according to claim 1, characterized in that the composite powder has a particle size of smaller than 5 μm.

3. Catalyst according to claim 2, characterized in that the support is coated with alpha-aluminium oxide powder.

4. Catalyst according to claim 3, characterized in that the alpha-aluminium oxide powder particles have a diameter about 10 times as large as the particles of the composite powder.

5. Process for the preparation of a catalyst having the features given in claim 1 consisting of the steps
preparation of a solution containing a salt of one or more catalytically active noble metals and a salt of one or more oxidizable metals whose oxides or mixed oxides have a structure stable up to at least 1,200° C. and do not react with the catalytically active noble metal,
subjecting this solution to spray pyrolysis in the presence of oxygen,
applying the composite powder thus produced to a support and attaching it thereon or in a surface layer by calcining in which the said support is free of gamma-aluminium oxide and transition aluminium oxide and has a structure stable up to at least 1,200° C. even without a stabilizing addition of rare earth metal oxides.

6. The process as claimed in claim 5 applied to supports made of alpha-aluminium oxide.

7. The process according to claim 5 applied to supports coated with alpha-aluminium oxide.

8. The process according to claim 5 applied to supports having a rough surface, the pores of the surface, which determine the roughness of the surfaces, being larger than the particles of the composite powder.

9. Process according to claim 8, characterized in that the pores have a diameter of about five times to fifty times as large as the particles of the composite powder.

10. The process according to claim 8, characterized in that the particles of the composite powder have a diameter between 0.1 μm and 10 μm.

11. Process according to claim 8, characterized in that the pores in the surface of the support have a diameter between 1 μm and 50 μm.

12. Process according to claim 7, characterized in that the coating of the support is carried out using an alpha-aluminium oxide powder whose particle size is between 1 μm and 100 μm.

13. The process according to claim 5, characterized in that those metal oxides are chosen for the composite powder which under the intended conditions for use of the catalyst favor the adduction of the substances to be reacted catalytically.

14. Process according to claim 13, characterized in that the metal oxide constituent of the composite powder chosen for the purification of the exhaust gases from internal combustion engines is cerium oxide.

15. Process according to claim 5, characterized in that the composite powder is milled in a ball mill, before it is applied to the support, in order to achieve a flake-like particle structure.

16. The process according to claim 8, in which the pores of the surface, which determines the roughness of the surfaces, are much larger than the particles of the composite powder.

17. The process according to claim 10, in which the particles of the composite powder have a diameter between 0.1 μm and 1 μm.

18. The process according to claim 12, in which the alpha-aluminium oxide powder exhibits a particle size between 5 μm and 50 μm.

* * * * *

UNITED STATES PATENT AND TRADEMARK OFFICE
CERTIFICATE OF CORRECTION

PATENT NO.   : 4,910,180
DATED        : March 20, 1990
INVENTOR(S)  : MALTE BERNDT, ET AL It is certified that error appears in the above-identified patent and that said Letters Patent is hereby corrected as shown below:

ON TITLE PAGE:

Change " [73]   Assignee: DODUCO GMBH & CO., Pforzheim" to read -- [73]   Assignee: DODUCO GMBH & CO. DR. EUGEN DÜRRWÄCHTER, Pforzheim--.

Signed and Sealed this

Thirtieth Day of July, 1991

Attest:

HARRY F. MANBECK, JR.

Attesting Officer     Commissioner of Patents and Trademarks